US008655974B2

(12) United States Patent
Frey et al.

(10) Patent No.: US 8,655,974 B2
(45) Date of Patent: Feb. 18, 2014

(54) ZERO COPY DATA TRANSMISSION IN A SOFTWARE BASED RDMA NETWORK STACK

(75) Inventors: Philip Frey, Uerikon (CH); Bernard Metzler, Zurich (CH); Fredy D. Neeser, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/771,232

(22) Filed: Apr. 30, 2010

(65) Prior Publication Data

US 2011/0270943 A1 Nov. 3, 2011

(51) Int. Cl.
*G06F 15/167* (2006.01)

(52) U.S. Cl.
USPC .............................. 709/212; 709/232; 711/138

(58) Field of Classification Search
None
See application file for complete search history.

(56) References Cited

U.S. PATENT DOCUMENTS

| | | | | |
|---|---|---|---|---|
| 6,880,040 B2* | 4/2005 | Basham et al. | | 711/111 |
| 6,910,082 B1* | 6/2005 | Marcotte | | 709/246 |
| 7,171,484 B1* | 1/2007 | Krause et al. | | 709/232 |
| 8,099,474 B2* | 1/2012 | Thorpe et al. | | 709/217 |
| 8,131,814 B1* | 3/2012 | Schlansker et al. | | 709/212 |
| 8,301,694 B2* | 10/2012 | Ittah et al. | | 709/203 |
| 2004/0049603 A1* | 3/2004 | Boyd et al. | | 710/1 |

FOREIGN PATENT DOCUMENTS

WO    WO2011/135515 A1    11/2011

OTHER PUBLICATIONS

Metzler et al., "SoftiWARP—Project Update. A Software IWARP Driver for OpenFabrics," OpenFabrics Alliance, 2010 Sonoma Workshop, Mar. 14-17, 2010, Mar. 17, 2010, pp. 1-11; retrieved from the Internet: URL: http://www.openfabrics.org/archives/spring2010sonoma/Wednesday/11.30.

Neeser et al., " SoftRDMA: Implementing iWARP over TCP Kernal Sockets," IBM Journal of Research and Development, International Business Machines Corporation, New York, NY US, vol. 54, No. 1, Jan. 1, 2010, pp. 5: 1-5: 16.

Openfabrics, "The OpenFabrics Alliance: News & Events", www.openfabrics.org, Mar. 14, 2010, pp. 1-3; retrieved from the Internet: URL:http://www.openfabrics.org/archives/sonoma2010.htm; retrieved on Sep. 9, 2011.

International Search Report and Written Opinion; International Application No. PCT/IB2011/051820; International Filing Date; Apr. 27, 2011; Date of Mailing: Oct. 10, 2011; 11 pages.

Culley et al., "RFC5044—Marker PDU Aligned Framing for TCP Specification", Hewitt-Packard Company; Oct. 2007; pp. 1-55; retrieved from http://faqs.org/rfcs/rfc5044.html.

Delessandro, et al.; "Software Implementation and Testing of iWarp Protocol". Ohio Supercomputer Center (OSC), Columbus, Ohio USA; Copyright 2009; pp. 1-4; retrieved on Apr. 30, 2010 from http://www.osc.edu/research/network_file/projects/iwarp_main.shtml.

(Continued)

*Primary Examiner* — Mohamed Ibrahim
(74) *Attorney, Agent, or Firm* — Cantor Colburn LLP; Daniel Morris

(57) ABSTRACT

A method for data transmission on a device without intermediate buffering is provided. An application request is received to transmit data from the device to a second device over a network. The data from application memory is formatted for transmitting to the second device. The data are transmitted from the device to the second device without intermediate buffering. A send state is retrieved. The send state is compared to expected send state. If the send state meets the expected send state, a completion of the data transmit request is generated.

22 Claims, 10 Drawing Sheets

(56) References Cited

OTHER PUBLICATIONS

Hilland, et al., RDMA Protocol Verbs Specification (Version 1.0); Apr. 23, 2003; pp. 1-243.

Pinkerton et al., "RFC5042—Direct Data Placement Protocol (DDP)/ Remote Direct", Microsoft Corporation; Oct. 2007; pp. 1-41; retrieved from http://www.faqs.org/rfcs/rfc5042.html.

Recio et al., "RFC5040—A Remote Direct Memory Access Protocol Specification", IBM Corporation, Oct. 2007; pp. 1-49; retrieved from http://wwwfaqs.org/rfcs/rfc5040.html.

The Open Alliance, "OpenFabrics Alliance", retrieved from the internet on Apr. 30, 2010 from http://www.openfabrics.org/ pp. 1-2.

The Open Group, "Corsortium Specification Interconnect Transport API (IT-API)"; Version 2.0, Mar. 2005; The Open Group; Part 1 of 3; pp. 1-149.

The Open Group, "Corsortium Specification Interconnect Transport API (IT-API)"; Version 2.0, Mar. 2005; The Open Group; Part 2 of 3; pp. 150-350.

The Open Group, "Corsortium Specification Interconnect Transport API (IT-API)"; Version 2.0, Mar. 2005; The Open Group; Part 3 of 3; pp. 351-443.

* cited by examiner

FIG. 4: Example iWARP Packet Creation and resultant TCP Sequence Space

FIG. 5: Example Multi-Fragment iWARP packet creation and resultant TCP Sequence Space FIG 6: Zero-copy data transmission in a software based RDMA stack.

FIG. 7: Using TCP Send State Information for Work Completion generation

FIG. 8: Handing over additional data to TCP before creating Work Completion

FIG. 9: Using TCP Send Queue Length and Sequence Numbers for Work Completion generation

US 8,655,974 B2

ZERO COPY DATA TRANSMISSION IN A SOFTWARE BASED RDMA NETWORK STACK

BACKGROUND

Exemplary embodiments of the present invention relate to data transmission, and more specifically, to zero-copy data transmission in a software based network stack.

Sending and receiving application data over a computer network induces data copy operations on both sending and receiving hosts. In a multi-user operating system, data typically need to be copied between application space and operating system kernel. In these systems, the application generates and consumes data while the operating system kernel is responsible for eventual data shipping to a remote application over a network or for receiving remote application data from a network. When using connection-oriented, reliable transport protocols like TCP which relay data retransmissions for guaranteeing data delivery, a copy of the data is created and stored in kernel space for use as a temporary buffer for refetching the data for the retransmits.

SUMMARY

According to one exemplary embodiment, a method for data transmission on a device without intermediate buffering is provided. A request is received to transmit data from the device to a second device over a network. The data from application memory is formatted for transmitting to the second device. A length of send queue is retrieved. The data are transmitted from the device to the second device without intermediate buffering. The length of send queue is compared to expected send queue length. If the length of the send queue is at least equal to and/or less than the expected send queue length, a completion element is generated.

According to another embodiment, a method for data transmission on a device without intermediate buffering is provided. A request is received to transmit data from the device to a second device over a network. The data from application memory is formatted for transmitting to the second device. A highest sequence number is computed at a point in time, and the highest sequence number is the summation of a length of send queue and an unacknowledged sequence number. The data are transmitted from the device to the second device without intermediate buffering. The highest sequence number is compared to the unacknowledged sequence number at a different point in time. If the highest sequence number is less than the unacknowledged sequence number at the different point in time, a completion element is generated.

Additional features are realized through the techniques of exemplary embodiments. Other embodiments are described in detail herein and are considered a part of the claimed invention. For a better understanding of features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features are apparent from the following detailed description taken in conjunction with the accompanying drawings in which:

DETAILED DESCRIPTION

Exemplary embodiments are configured to provide a mechanism for Remote Direct Memory Access (RDMA). RDMA is a communication paradigm whereby application data is fetched directly out of a computer's local application memory and directly placed into the application memory of a remote computer. In bypassing the operating system and avoiding intermediate data copies in host memory, RDMA significantly reduces the CPU cost of large data transfers. Complete data copy avoidance (zero-copy) is achieved if the network interface card (NIC) is able to move networked data directly between the application (buffer) memory and NIC buffer using a DMA engine.

Figure 1:
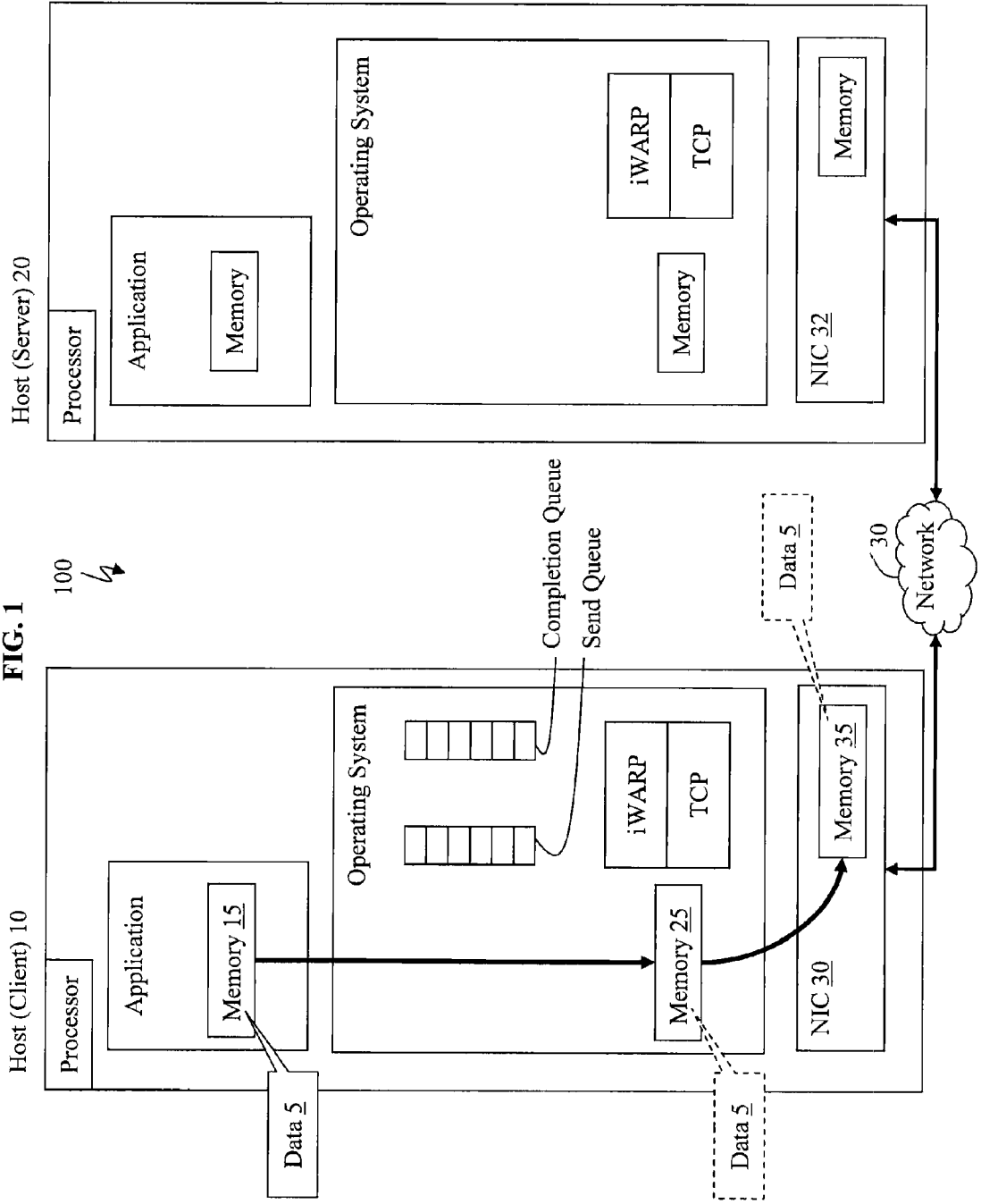
FIG. 1 is a block diagram illustrating a normal host computer system transmitting information to another host computer system.
Figure 2:
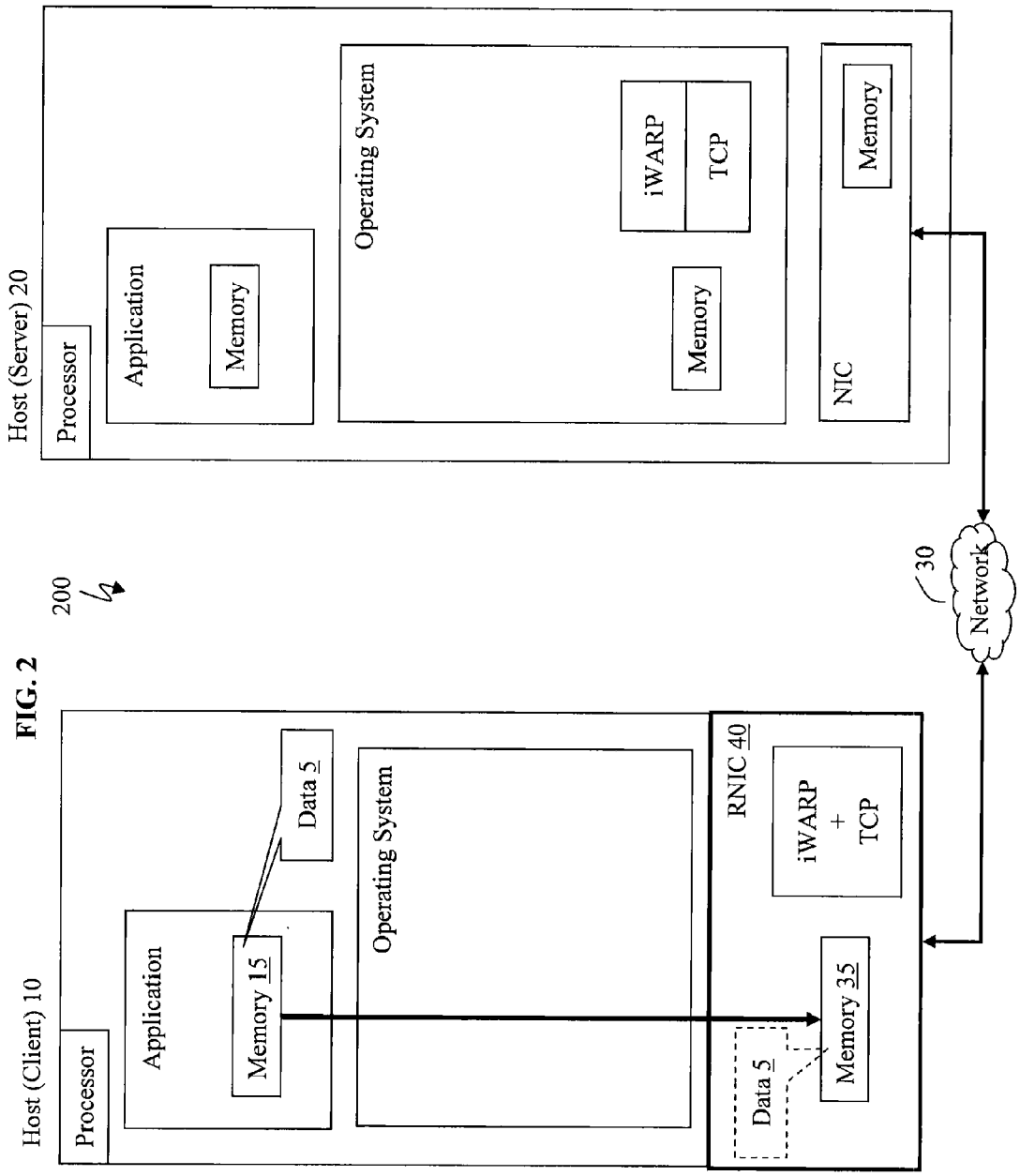
FIG. 2 is a block diagram illustrating an example of additional hardware called a remote direct memory access network interface card (RNIC) in place of the legacy NIC.

To provide context, FIGS. 1 and 2 are provided to illustrate the state of the art. FIG. 1 is a block diagram 100 illustrating a normal host computer system transmitting information to another host computer system. For explanation purposes host computer system 10 is considered a client computer system and host computer system 20 is considered a server computer system. For example, data 5 in application memory 15 is to be transmitted to the host server 20 over network 30. To transmit the data 5 from application memory 15, a copy of the data 5 (represented as dashed lines) is copied and stored in operating system (kernel) memory 25. A copy of the data 5 is copied from the operating system memory 25 to the network interface card memory 35 of network interface card (NIC) 30 for transmission to the host server 20. The NIC 30 of the host client 10 transmits the copy of the data 5 from the host client 10 to the host server 20. The NIC 30 is a legacy NIC, which may be an Ethernet network interface card (ENIC). Further regarding the network interface card 30, the network interface card also called a network adapter, network interface controller (NIC), or LAN adapter is a computer hardware component designed to allow computers to communicate over a computer network.

FIG. 2 is a block diagram 200 illustrating an example of additional hardware called a remote direct memory access network interface card (RNIC) 40 in the host client 10 in place of the legacy NIC 30. The following is an example of data transfer with the RNIC 40. The application post RDMA work requests (WRs) defining the data transfers to transfers to work queues which are accessible by the RDMA device RNIC 40. The RNIC 40 processes these RDMA WRs asynchronously and in order. The RNIC 40 copies a copy of the data 5 from the application memory 15 into the RNIC memory 45. Once the data 5 (shown as dashed lines) is copied into the RNIC memory 45, the RDMA device which is RNIC 40 notifies the application through a completion event when that the RNIC 40 is done processing the WR. The application reaps the work completion (WC) corresponding to the WR from the completion queue. In other words, the RNIC 40 notifies the application that the WR is completed (through the completion event and a WC) after the copy of data 5 has been copied into the RNIC memory 45 not when the data 5 is transmitted to the host server 20.

Figure 3:
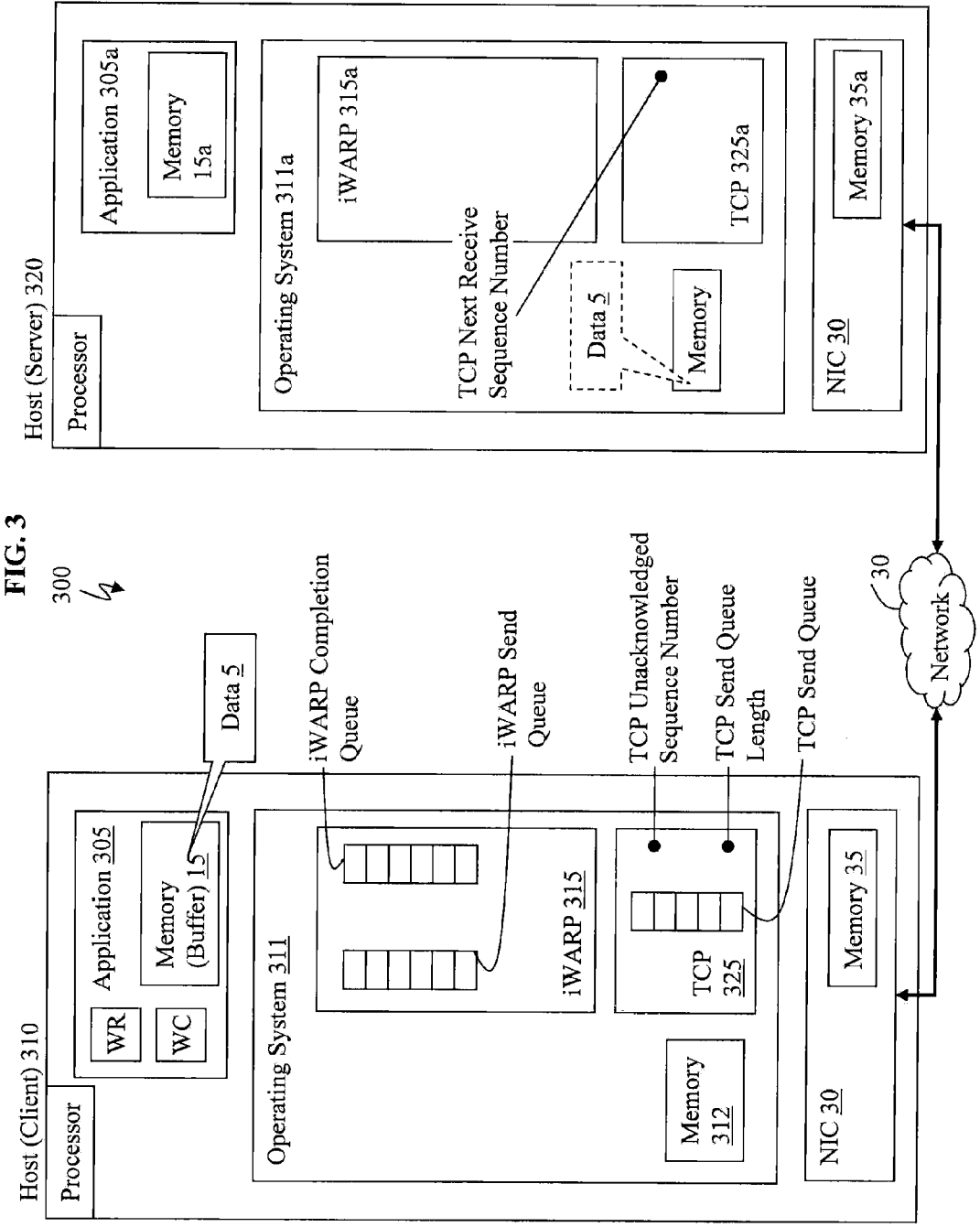
FIG. 3 illustrates a block diagram in accordance with exemplary embodiments.

As illustrated in FIG. 3, exemplary embodiments present a mechanism which allows zero-copy data transmission in a software based RDMA network stack (implemented in the iWARP module 315) by not requiring intermediate data buffering in host operating system memory 312. Work Requests (WR) requested (generated) by the application 305 are utilized to transfer application (buffer) memory 15 ownership from the application 305 to the iWARP module 315. Work completions (WC) generated by the iWARP module 315 are used to transfer application (buffer) memory 15 ownership from the iWARP module 315 back to the application 305. However, in a typical software implementation of the iWARP transport stack of FIG. 1, Work Completions (WR) are generated only when the data 5 to be sent was completely handed over to the TCP, by having the TCP keep its own private copy of these data 5 for transmission and eventual retransmission, and the upper layer iWARP stack has no explicit information on when data was received by the peer.

In exemplary embodiments, zero-copy transmission can be achieved in a software stack which is the iWARP module 315, if the local TCP transmits data out of the original application buffer described by the Work Request and the creation of the Work Completion can be delayed until it is assured that the data are successfully received by the peer TCP entity of the receiving host system. Exemplary embodiments utilize local TCP send state information for detecting the successful transmission of the send buffer.

Exemplary embodiments read local TCP send state information during the handover of the iWARP frames containing the application data to the local TCP and compare this then saved TCP send state to the TCP send state information retrieved at a later point in time. A Work Completion for a Work Request gets generated only if the comparison of the saved TCP send state information and the current TCP send state information yields that all data belonging to the Work Request are successfully received by the peer.

The present disclosure describes two methods to detect the successful transmission of data to the TCP peer host system. One method uses information on the length of the local TCP send queue and local TCP's current send sequence number during data handover to TCP the and TCP's acknowledgement sequence number at a later point in time. The other method only relies on information about the length of the local TCP send queue during data handover and at a later point in time. The deployment of one of these two methods might be dependent on the availability of the needed TCP state information.

Now turning to FIG. 3 in more detail, FIG. 3 illustrates a block diagram 300 in accordance with exemplary embodiments. FIG. 3 illustrates a host computer system 310 operatively connected to a host computer system 320. For explanation purposes, the host computer system 310 represents a host client 310 and the host computer system 320 represents a host server 320. The host client 310 and host server 320 may be considered peer entities.

In the host client 310, an application 305 is coupled to application memory 15 which includes data 5. An operating system 311 is coupled to operating system memory 312 (also referred to as kernel memory 312). The operating system 311 includes a modified iWARP 315 module (i.e., iWARP stack) and modified TCP module 325. The modified iWARP 315 and modified TCP module 325 are configured to include features to implement exemplary embodiments along with the normal features as understood in the art. The iWARP module 315 and TCP module 325 may be referred to as an iWARP/TCP stack as understood by one skilled in the art.

The host client 310 includes the NIC 30 and NIC memory 35. The NIC 30 may be considered a legacy NIC, an Ethernet NIC (ENIC), and/or any normal NIC that does not require and/or include the additional hardware of an RNIC to implement zero-copy data transmission and/or remote direct memory access (RMDA). The host server 320 may include similar elements of the host client 310, such as an application 305a coupled to memory 15a and an operating system 311a coupled to memory 312a. The operating system 311a may (or may not) include a modified iWARP module 315a and TCP module 320a. The NIC 30 of host server may be a legacy NIC and/or a RNIC.

In exemplary embodiments, the data transfer described in exemplary embodiments may be based on application (buffer) memory 15 ownership rules in which by the application 305 posting a WR for a data transfer to/from the application buffer memory 15, the application 305 temporarily passes ownership of that buffer to the iWARP 315 (and/or the TCP module 325); the iWARP 315 transmits the data 5 (via the TCP module 325) from the host client 310 to the host server 320 and the iWARP 315 notifies the application 305 upon completion. By making the application data 5 instantly available to transports from the beginning of transmission to the reception of the acknowledgment (from the host server 320), this rule allows a suitably designed transport implementation to avoid intermediate data copies in kernel buffers (such as but not limited to operating system memory 312).

Exemplary embodiments enable RDMA semantics and interfaces on hosts equipped only with legacy Ethernet NICs (ENICs), making those host systems interoperable with RNIC-equipped peers (e.g., for client/server based multimedia data dissemination).

For data transmission to the host server 320, the iWARP stack 315 adds its protocol control information to the application data 5 and may create one or multiple iWARP packets. The resultant packets handed over to TCP 325 comprise RDMA control information (such as RDMAP, DDP, MPA headers, MPA trailers, and MPA markers if enabled) and the application data 5. The TCP 325 transports the iWARP packets as a non-interpreted byte stream. Therefore, both RDMA control information and application data 5 are referenced by TCP sequence numbers and contribute to the TCP send queue length if the packet gets added. If the TCP 325a of host server 320 acknowledges the complete reception of all packets belonging to the current transfer, the iWARP stack 315 can assume that the application data 5 are received by the peer TCP 325a of the host server 320.

Figure 4:
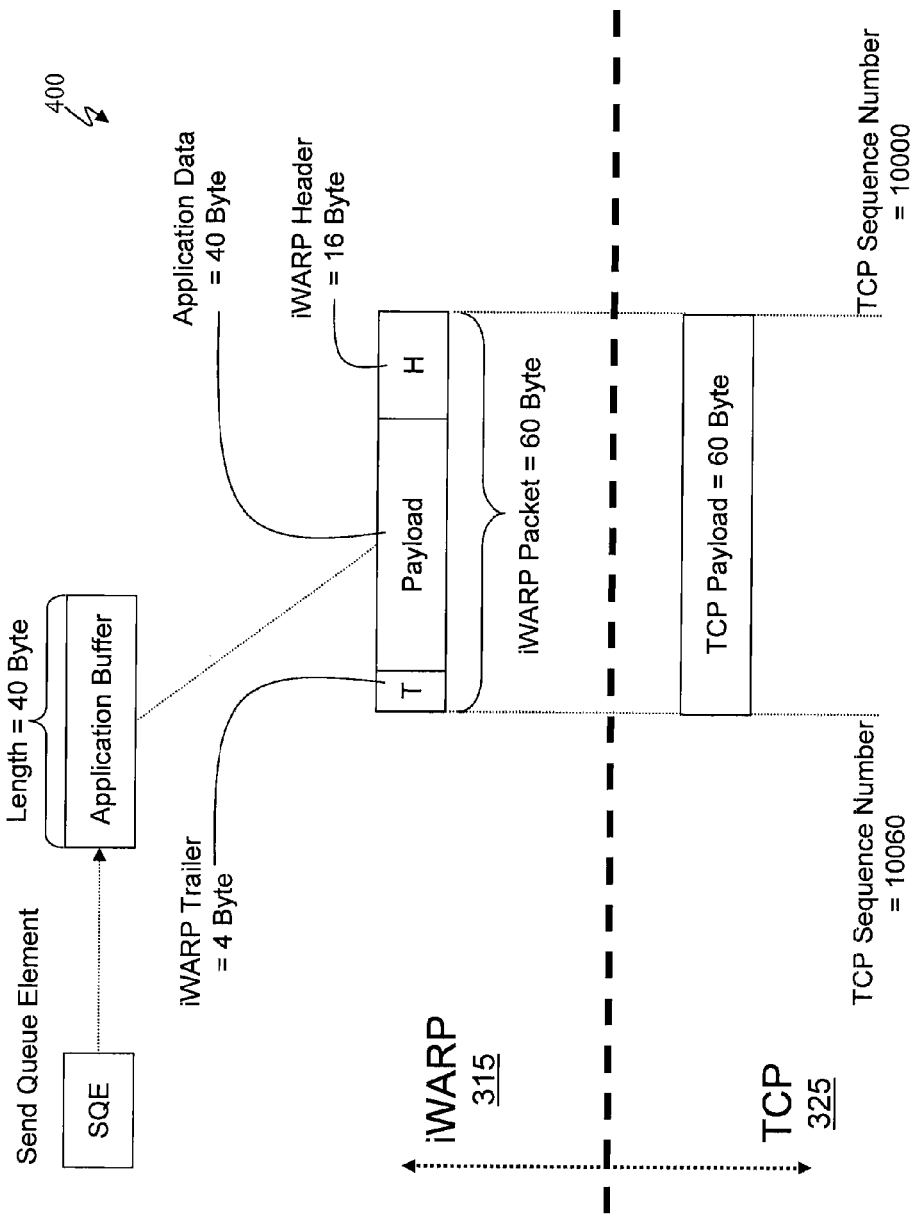
FIG. 4 illustrates an example iWARP packet creation and resultant TCP sequence space.

As an example, refer to FIG. 4. FIG. 4 illustrates an example iWARP packet creation and resultant TCP sequence space in diagram 400. The diagram illustrates an example of how the data 5 may be prepared for transfer from host client 310 to host client 320. The diagram 400 depicts an upper area and a lower area. The upper area represents interface operations of the iWARP module 315 and the lower area represent interface operations of the TCP module 325.

In this example, assume that the application (user) 305 hands over 40 bytes of data 5 to the iWARP 315 for transmission in an RDMA Write Work Request. The iWARP (stack) module 315 may construct one packet (or more) containing these 40 bytes of application (user) data 5 plus an iWARP header of 16 bytes and an iWARP trailer of 4 bytes, thus resulting in a packet of length 60 bytes. From right to left, the iWARP packet of length 60 bytes depicts the iWARP header (H), the payload (which is the application data 5 from the memory 15), and the iWARP trailer (T). The iWARP packet constructed by the iWARP 315 and passed to the TCP 315 consumes 60 bytes of TCP sequence space, and the iWARP packet contributes 60 bytes to the length of the TCP send queue. Even though the iWARP module 315 may append the iWARP header and trailer to the data 5 (payload), for explanation purposes the entire length of the iWARP packet may be considered as the data 5 (or data packet 5). Depending on the amount of data 5 transferred from the application memory 15, there may be multiple data packets 5 created.

Figure 5:
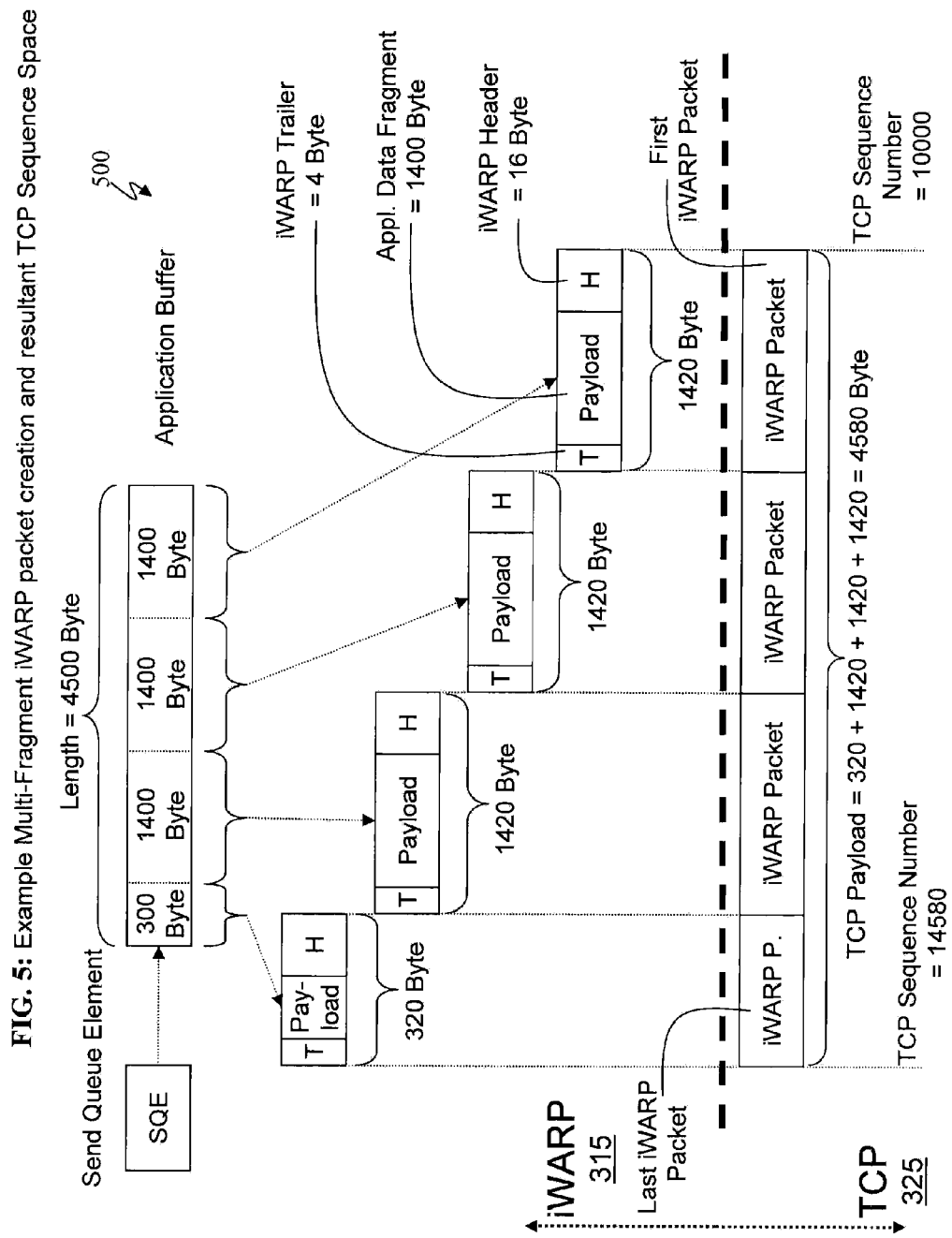
FIG. 5 illustrates multi-fragment iWARP packet creation and resultant TCP sequence space.

Larger amounts of application data 5 are segmented into multiple iWARP packets each carrying a fraction of the application data 5 and iWARP control information as illustrated in FIG. 5. FIG. 5 illustrates example packet fragmentation and result TCP sequence space. Diagram 500 depicts interface operations of the iWARP module 315 in an upper area and interface operations of the TCP module 325 in a lower area. In this example, 4500 bytes of application data 5 are handed over to TCP 325 within 4 consecutive iWARP packets with a cumulative length of 4580 bytes in diagram 500. Here, processing the Send Queue Element will consume 4580 bytes of TCP send sequence space and will contribute 4580 bytes to the length of the TCP send queue.

Each payload of the data 5 is fragmented (broken) into a length of 1400 bytes and one payload is fragmented (broken) into a length of 300 bytes by the iWARP 315. The iWARP 315 adds an iWARP header of 16 bytes and iWARP trailer of 4 bytes to each payload. The iWARP 315 passes three iWARP packets of 1420 bytes and one iWARP packet of 320 bytes.

So if the TCP sequence number started at, e.g., 10000, after adding the 4 iWARP packets the TCP sequence number is 14580. These iWARP packets would be sent from the host client 310 to the host server 320.

Figure 6:
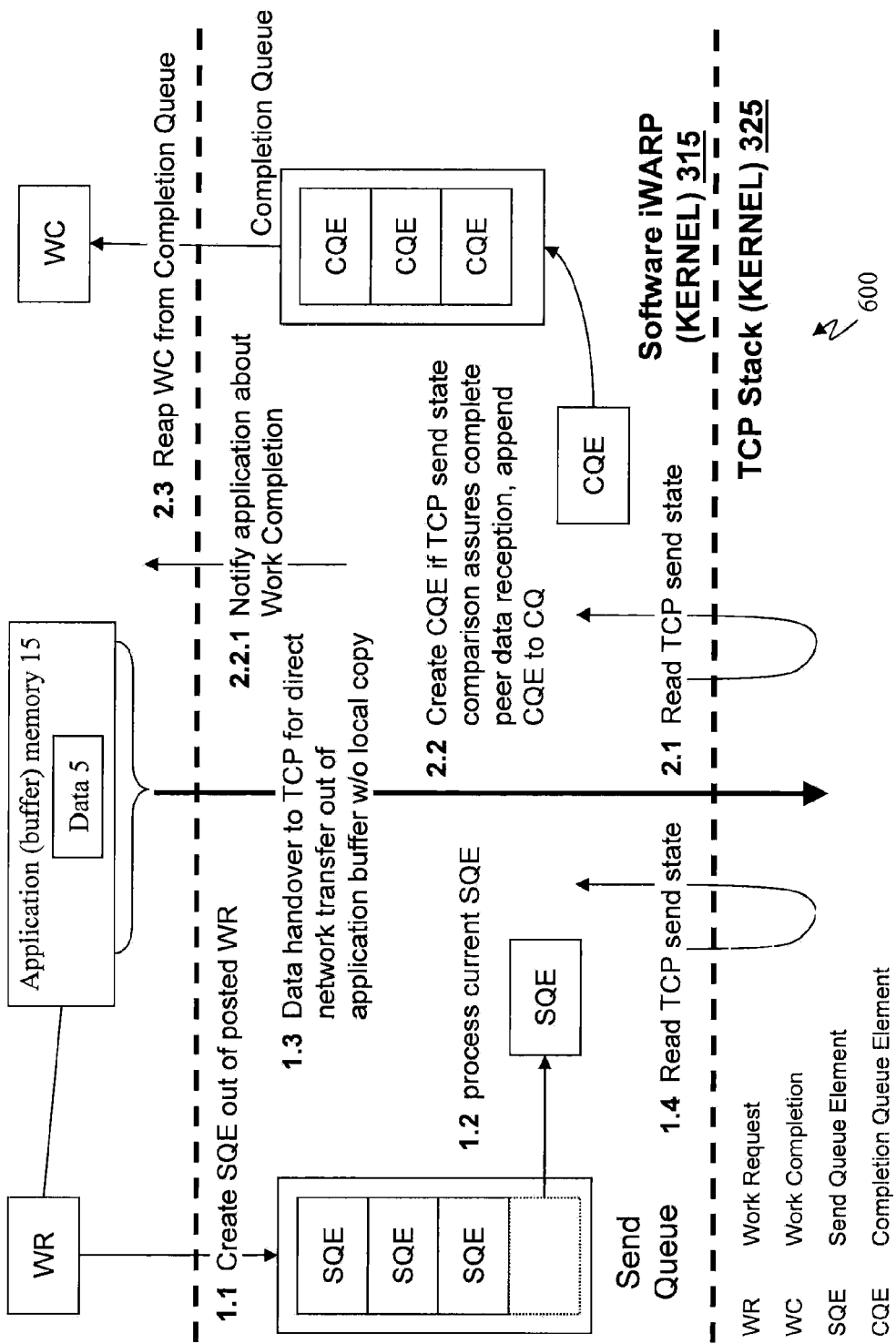
FIGS. 6-9 illustrate methods in accordance with exemplary embodiments.

For explanation purposes, exemplary embodiments may be referred to as comprising two set of operations illustrated in FIG. 6. FIG. 6 illustrates a diagram 600 in accordance with exemplary embodiments implemented in the diagram 300 of FIG. 3. In FIG. 6, the upper area represents interface operations of application 305, the middle area represents interface operations of the iWARP module 315, and the lower area represents interface operations of the TCP module 325 according to exemplary embodiments.

The application 305 posts (generates) a work request (WR) to the iWARP 315. The iWARP 315 creates a Send Queue Element (SQE) out of the Work Request (WR) posted by the application at operation 1.1. Both the WR and SQE have the same identification number (e.g., ID=1) discussed below.

The iWARP 315 adds the SQE to the iWARP Send Queue and there may be additional SQEs already in the Send Queue, to be processed by the iWARP before the current SQE. When the iWARP reaches the current SQE, the current SQE gets processed from the Send Queue in a first-in-first-out manner by the iWARP 315 at operation 1.2.

During SQE processing by the iWARP 315, (application) data 5 is handed over to TCP 325 (via iWARP 315) for direct transmission without intermediate data copying at operation 1.3. Particularly, the application 305 gives the TCP 325 permission (ownership) to the application (buffer) memory 15 and hands over a reference pointer (in memory 15) to the location of the data 5. Also, the iWARP 315 adds the iWARP headers and iWARP trailers to the data packets 5 (as discussed in FIGS. 4 and 5) before (or while) handing the data 5 to the TCP 325 for transmission of the data 5 (as data packets 5) from the host client 310 to the host server 320.

After handing over all data 5 (which includes data packets 5 created in FIGS. 4 and 5 with additional iWARP headers and trailers) to TCP 325 for transfer, the local TCP 325 send state is retrieved and stored in the memory 312 by the iWARP 315 at operation 1.4. The iWARP 315 retrieves TCP send state (information) of the TCP 325 as further discussed in FIGS. 7-9.

Data 5 is transmitted and/or in the process of being transmitted from the TCP 325 of the host client 310 to the TCP 325a of the host server 320. The TCP send state of TCP 325 is accessed again at a later point in time by the iWARP 315 at operation 2.1 and compared by the iWARP 315 to the stored TCP send state information (in memory 312) previously retrieved in operation 1.4. If the comparison of stored TCP sent state information (from memory 312) and new TCP send state information (just retrieved) by the iWARP 315 indicates complete data 5 delivery to the peer, the iWARP 315 completes (the WR corresponding to) the SQE of the Send Queue by creating a corresponding Completion Queue Element (CQE), and the iWARP 315 adds the CQE to the Completion Queue at operation 2.2. The application 205 later reaps the CQE from the Completion Queue as a Work Completion (WC) at operation 2.3. The application 305 may simply poll (periodically) for Work Completions (WC) (which are translated from the corresponding CQE), and/or the application 305 may be informed by the software iWARP stack 315 of the CQE at operation 2.2.1. If the comparison by the iWARP 325 of the stored (from memory 312) and new TCP send state information does not indicate complete data delivery to the host sever 320, the iWARP 325 may execute operations 2.1-2.3 again later (repeatedly as needed).

Note that it is implementation dependent on when to execute the operation 2.1 of reading the TCP send state by the iWARP 315. Implementations of operation 2.1 by the iWARP 315 may include, but are not limited to:

reading this TCP send state information during a callback of TCP 325 (e.g., when the TCP 325 notifies the iWARP 315) to signal the availability of new send space in the TCP Send Queue;

reading this TCP sent state information cyclic;

reading this TCP sent state information after handing over (by the iWARP 315) all data packets corresponding to a next SQE, if the application 305 has posted a consecutive WR before the iWARP 315 has completed the current SQE;

reading this TCP sent state information if a certain amount of Work Queue Elements are processed but not yet completed by the iWARP 315.

Any useful combination of the mentioned techniques is possible.

Due to the delay between packet handover to TCP 325 (for transmission to the host server 320) in the operation 1.3 and reading the TCP send state of TCP 325 in the operation 1.4, the operation 1.4 of the iWARP 315 reading the TCP send state may already indicate that all iWARP packets belonging to the current Send Queue Element are transmitted and acknowledged by the TCP 325a of the host server 320 (peer). In this case, the Completion Queue Element can be created immediately by the iWARP 315 in the operation 2.2 and the Work Completion can be reaped by the application 305 in the operation 2.3.

Work Requests (WR) are utilized to transfer (buffer) memory ownership from the application 305 to the iWARP stack 315 (TCP 325). Work completions (WC) which are translated from or based on completion queue elements (CQE) are utilized to transfer buffer ownership from the iWARP stack 315 (TCP 325) back to the application 305. In a typical software implementation of the iWARP transport stack, Work Completions are generated when the data to be sent was completely handed over to TCP, because TCP copies and keeps its private copy (i.e., intermediate copy) of these data for transmission and eventual retransmission; in the typical software implementation the upper layer iWARP stack has no explicit information on when data was received by the peer.

In exemplary embodiments, zero-copy transmission can be achieved in a software stack (iWARP/TCP stack 315 and 325), if the local TCP 325 transmits data out of the original application buffer 15 described by the Work Request and if the creation of the Work Completion can be delayed until the iWARP 315 is assured that the data 5 are successfully received by the peer TCP entity 325a of the host server 320. Exemplary embodiments utilize local TCP send state information for detecting the successful transmission of the send buffer.

The modified iWARP 315 reads local TCP send state information during the handover of the iWARP packets (frames) containing the application data 5 to the local TCP 325 and compares this then saved TCP send state to the TCP send state information retrieved at a later point in time. A Work Completion for a Work Request gets generated only if the comparison of the saved TCP send state information and the current TCP send state information yields that all data belonging to the Work Request are successfully received by the peer.

Exemplary embodiments illustrate two methods to detect the successful transmission of data to the TCP entity 325a on host server 320. One method uses information on the length of the local TCP send queue and local TCP's current send sequence number during data handover to TCP the and TCP's acknowledgement sequence number at a later point in time. The other method utilizes information about the length of the local TCP send queue during data handover and at a later point in time. The deployment of one of these two methods might be dependent on the availability of the needed TCP state information.

In the following, the two methods to implement FIG. 6 are described in more detail in FIGS. 7-9. The two methods particularly differ in the type of TCP send state information that is interpreted (by the iWARP 325) to retrieve the correct trigger for Work Completion creation.

The first method utilizes TCP Send Queue length information (only). Monitoring the length of the TCP send queue (QLen) can be sufficient to detect the successful data reception at the host server 320. The length of the TCP send queue corresponds to all data bytes handed over to TCP 325 for transmission which are not consecutively received by the peer TCP 325a. In a first set of operations, all packets belonging to the transfer of all user data of the current SQE are handed over from iWARP 315 to TCP 325 and the QLen is retrieved from the TCP 325. If the QLen is not zero, an Expected TCP send queue length (EQL) of zero is stored along with the SQE. If EQL is zero, the SQE can be completed immediately. In a second set of operations, if the SQE was not completed immediately, at an appropriate point in time, the TCP QLen is retrieved again. QLen is compared to the EQL of the SQE. If it is equal or less, all data are now received by the peer and the SQE can be completed now. If it is greater than EQL, the SQE cannot be completed and the second step must be executed again later.

Figure 7:
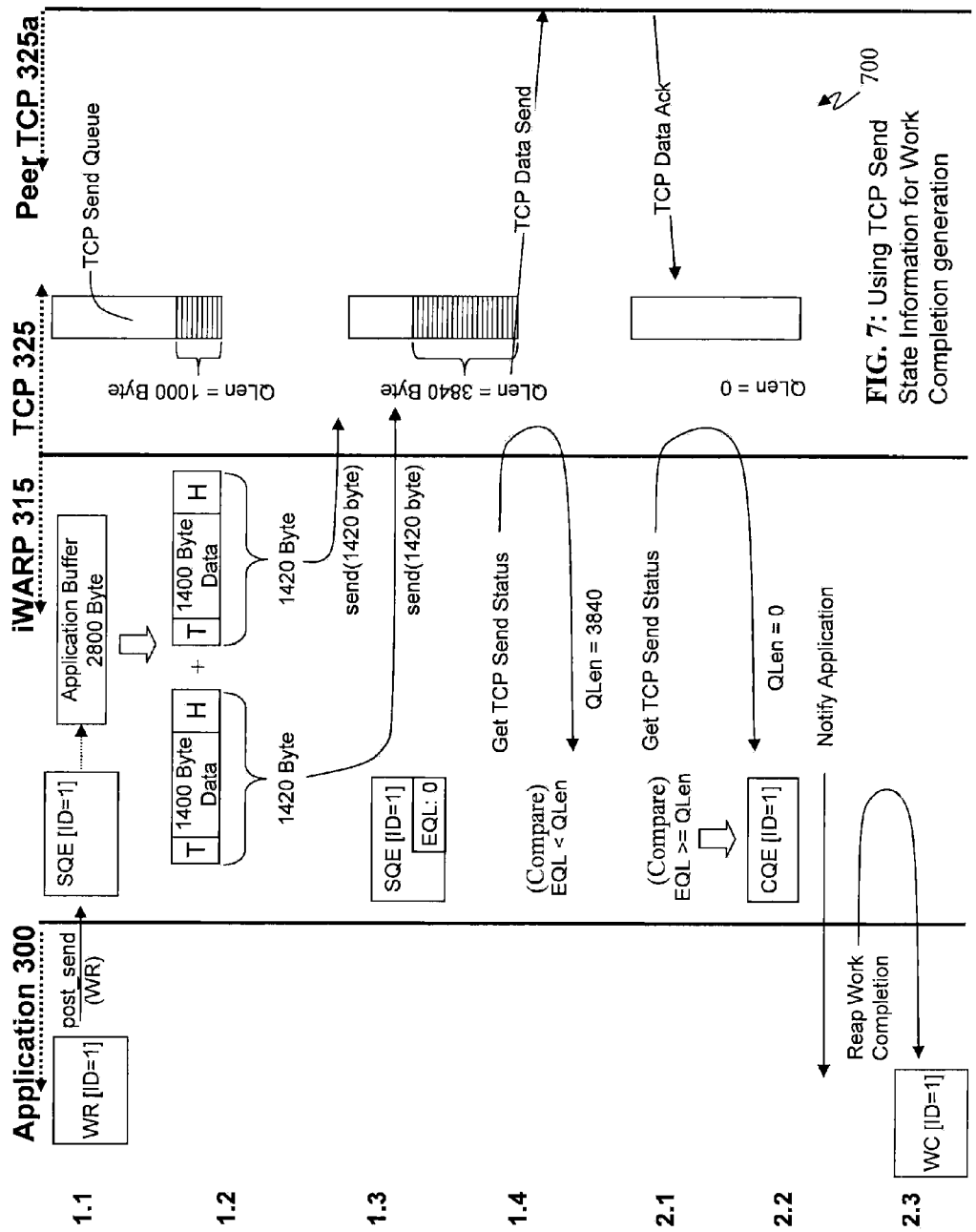
Figure 8:
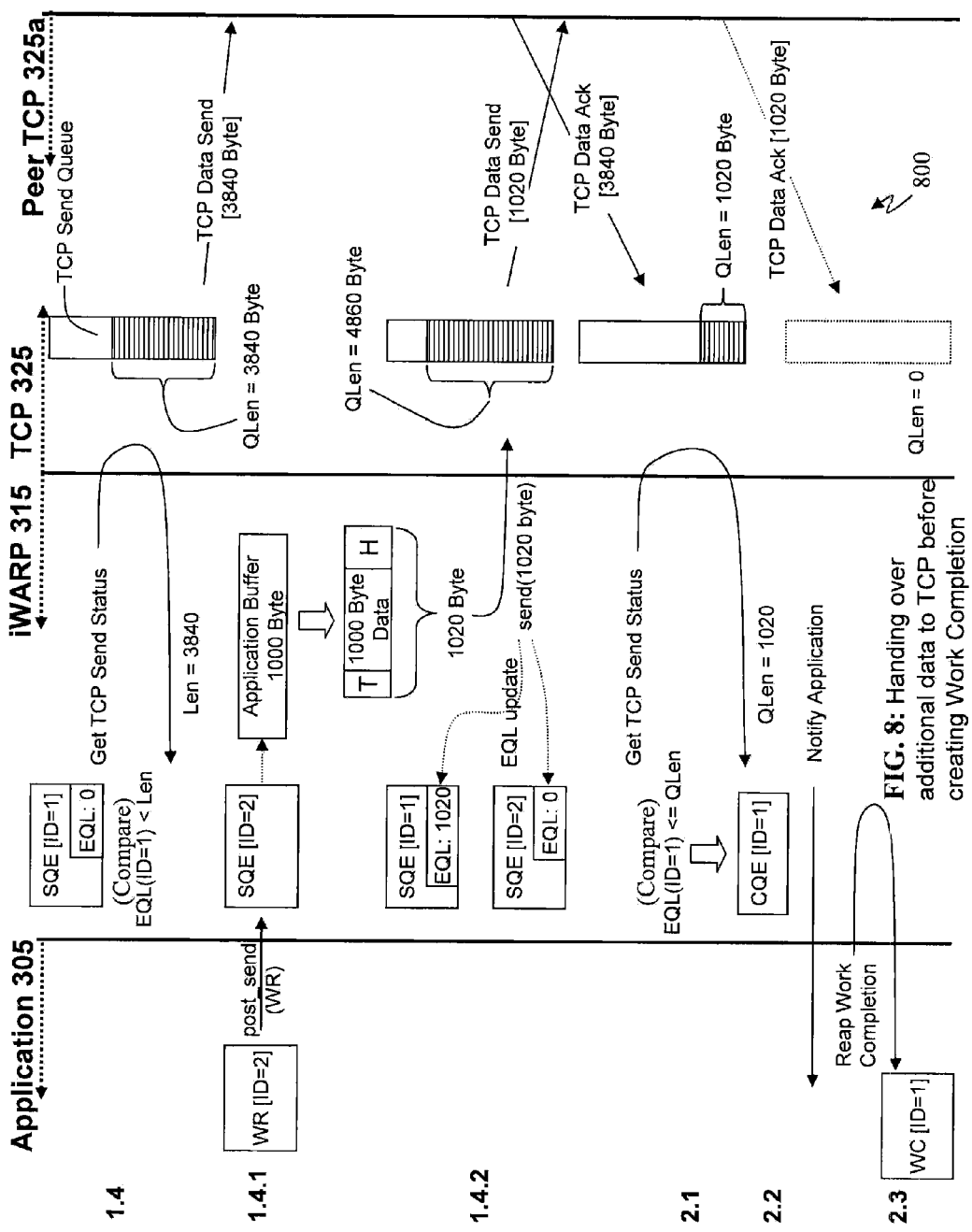

FIG. 7 illustrates an example of the first method in a time sequence diagram 700 in accordance with exemplary embodiments. In the diagram 700, time proceeds from the top to the bottom. The diagram 700 illustrates interface operations for the application 305, the iWARP module 315, and the TCP module 325 of the host client 310 transmitting the data 5, and the TCP 325a of the host server 320 receiving the data 5.

At operation 1.1, the application 305 posts a Work Request (WR) with ID=1 referencing application data 5 of length 2800 bytes (in the application (buffer) memory 15) to be transmitted to the host server (peer) 320. The iWARP stack 315 creates a Send Queue Element (SQE) with the same ID=1 and inserts the SQE into the iWARP Send Queue (Send Queue shown in FIG. 3).

At operation 1.2, the iWARP stack 315 processes the SQE and constructs two iWARP packets (e.g., with iWARP headers and trailers) each referencing 1400 bytes of the application data 5 in the application (buffer) memory 15.

With the added iWARP header and trailer information, the iWARP packets with a cumulative size of 2840 bytes are handed over (by the iWARP 315) to the TCP 325 in operation 1.3. After iWARP packet handover to the TCP 325, the iWARP 315 saves an expected TCP send queue length (EQL) of zero along with the SQE in the memory 312.

At operation 1.4, the iWARP stack 325 reads the current TCP send queue length (QLen). At this point, the two iWARP packets of 1420 bytes each have been added (handed over to the TCP 325 for adding) to the TCP send queue by the iWARP 325. The TCP send queue has a current (QLen) length of 3840 bytes. Here, QLen of 3840 bytes results from the byte length of the current packet handover (of 2840 bytes) to TCP 325 plus an additional 1000 bytes which were already stored in the TCP send queue from an earlier data handover (not shown in FIG. 7) to TCP 315. The iWARP 325 retrieves the TCP send status of the TCP send queue by reading the QLen of the TCP send queue to compare the QLen to the EQL. By the iWARP 325 comparing this value of the QLen (which is 3840 bytes for this example) to the EQL (which is 0) of the SQE, the comparison indicates that not all data 5 belonging to the current Work Request (WR) are yet successfully transmitted to the host server 320.

For example, when processing the SQE, after the iWARP 315 hands over the last iWARP packet belonging to this SQE to TCP 325, an Expected TCP Queue Length (EQL) of zero is stored along with the SQE in memory 312. Now, the eventual length of the TCP send queue (QLen) is retrieved and compared to the EQL by the iWARP 315. If the eventual length (at this point in time) of the TCP send queue (QLen) is greater than EQL, the iWARP 315 cannot complete the SQE (corresponding to the example WR with ID=1 in operation 1.1), and the iWARP 315 does not (at this time) create a completion queue element (CQE) for this SQE (with ID=1). If the QLen is equal to and/or less than EQL, the iWARP 315 determines that all data 5 are already received by the host server 320, and the SQE can be completed immediately by the iWARP 315.

Assume, however, that the SQE (for ID=1) was not completed because the QLen is greater than the EQL (0). At operation 2.1, the iWARP stack 315 reads QLen again (later point in time). Now, the QLen has a current length of zero bytes, which is equal to the EQL (zero) and thus indicates (to the iWARP 315) that all data 5 belonging to the current SQE (with ID=1) are successfully received by the host server 320.

At operation 2.2, a Completion Queue Element (CQE) with ID=1 gets created and appended to the Completion Queue (Completion Queue shown in FIG. 3) by the iWARP 315. In operation 2.2, the application 305 may get informed of the availability of a CQE by the iWARP 315.

At operation 2.3, the application 305 reaps (reads the CQE of the completion queue as) a Work Completion (WC) with an ID=1, which corresponds to the initially posted Work Request (WR) with ID=1. When the application 305 reads the WC with ID=1, the iWARP 315 (TCP 325) passes ownership of the application (buffer) memory 312 back to the application 305.

As mentioned above, executing the first read (at operation 1.4) of the TCP send state may indicate that all data packets belonging to the current work queue element are already received by the host server 320. Accordingly, if the QLen is already zero at operation 1.4, the Completion Queue Element in operation 2.2 can be immediately created by the iWARP 315 and operation 2.1 is omitted (not needed in this case).

If (in the time span) between operation 1.4 and operation 2.1 iWARP packets belonging to consecutive Send Queue Elements are handed over to TCP 325, the cumulative length of these packets must be added to the EQL of all previously processed, but not yet completed SQE's that were originally set to zero in the operation 1.3. FIG. 8 exemplifies such a case. For clarity, FIG. 8 omits the operations 1.1 through 1.3 for processing the first Send Queue Element. For operation 1.1 through 1.3, all operations and parameters are identical to the example given in previous FIG. 7. In accordance with exemplary embodiments, FIG. 8 illustrates a time diagram 800 for the first method in which the iWARP 315 (or another software application) handing over additional data to the TCP 325 before the iWARP 315 creates a work completion (i.e., CQE). For this scenario, it is assumed that one additional SQE gets processed before the TCP send state is queried again in the operation 2.1.

At operation 1.4, the TCP send queue length (QLen) is examined after the last iWARP packet from SQE with ID=1 is handed over to the TCP 325. Since the resultant queue length is not zero, SQE with ID=1 cannot be completed immediately by the iWARP 315.

At operation 1.4.1, one additional SQE with ID=2 gets processed by the iWARP 315. The resultant (intervening) iWARP packet of length 1020 bytes gets handed over to TCP 325.

At operation 1.4.2, the iWARP 315 remembers the additional data (for SQE with ID=2) handed over to TCP 325 along with the first data (for SQE with ID=1), and the iWARP 315 increments the EQL to 1020 for the first SQE with ID=1. Now, a TCP QLen of 1020 and/or less is sufficient to complete the first SQE, and a QLen of zero is needed to complete the second SQE with ID=2, which has an EQL of zero. (In other words, the iWARP 315 is configured to update (increment) the EQL for each not completed SQE (handed to the TCP 325) to reflect intervening data packets added to the TCP send queue before a completion queue element is created for the outstanding SQEs.)

At operation 2.1, the QLen is examined (read) again by the iWARP 315. Since the peer TCP (instance) 325a of host server 320 acknowledged the reception of all data belonging to the first SQE (with ID=1), the TCP send queue for the TCP 325 only contains data corresponding to the second SQE (with ID=2). Consequently, the QLen is 1020 as read by the iWARP 315. As mentioned herein, the iWARP 315 compares the current QLen to the EQL for ID=1 of the first SQE. Comparing the EQL of the first SQE with QLen of 1020 yields that all data belonging to the first SQE with ID=1 are received by the host server 320. In other words, the iWARP 315 determines that the EQL of 1020 is less than and/or equal to the QLen of 1020.

At operation 2.2, a Completion Queue Element (CQE) with ID=1 gets created and appended to the Completion Queue (Completion Queue shown in FIG. 3) by the iWARP 315. In operation 2.2, the application 305 may get informed of the availability of a CQE by, e.g., the iWARP 315.

At operation 2.3, the application 305 reaps a Work Completion with an ID=1 (by reading the CQE with ID=1), which corresponds to the initially posted Work Request (WR) with ID=1.

Note that in FIG. 8 at operation 2.1, the second SQE with ID=2 cannot be completed, since its EQL of zero is below the current QLen of 1020. Another peer TCP 325a acknowledgment of host server 320 (shown in dotted lines in FIG. 8) may allow the completion of the second SQE later. Also, if the QLen happened to be zero at operation 2.1, the iWARP 315 would complete both the first SQE (with ID=1) and the second SQE (with ID=2).

Figure 9:
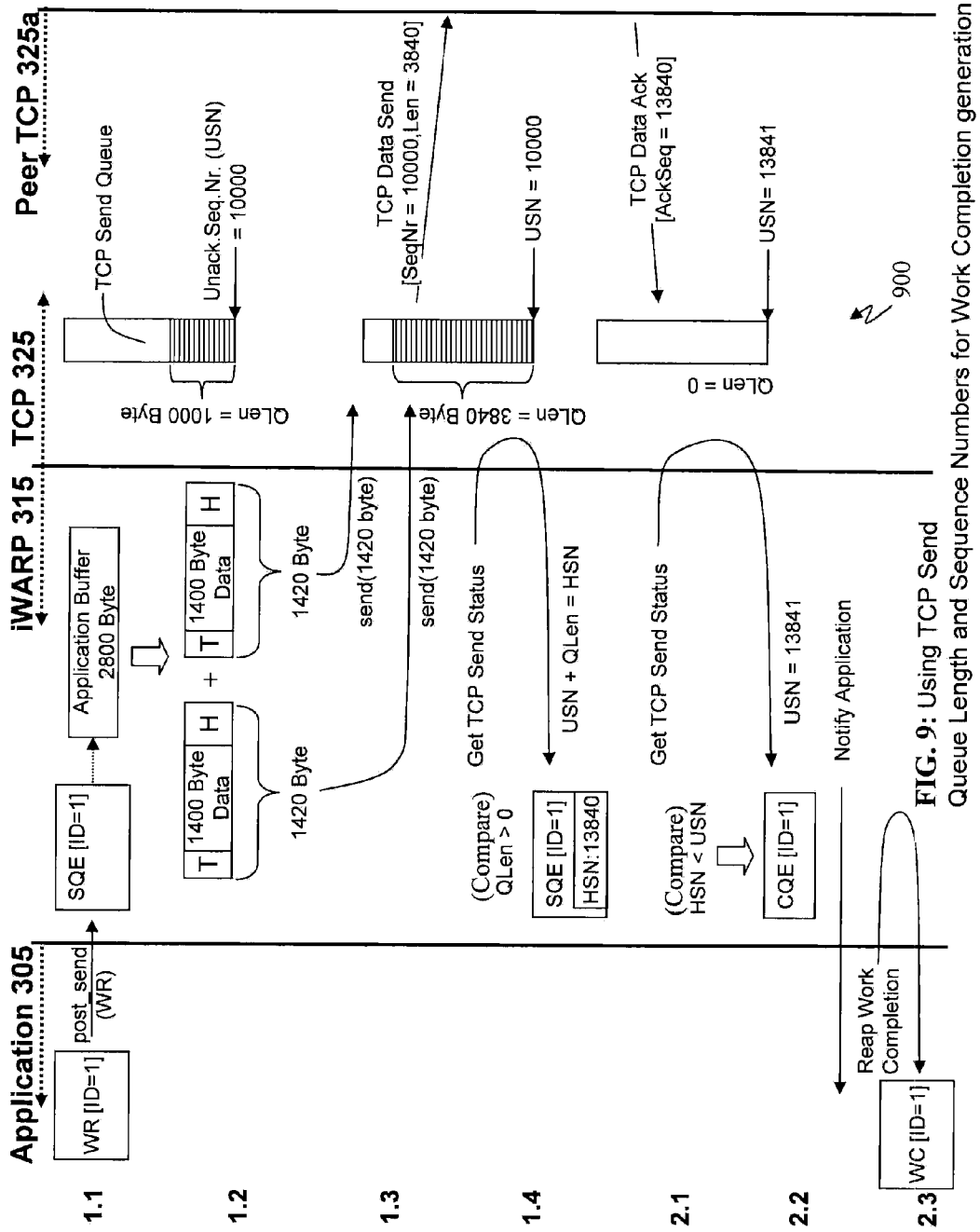

FIG. 9 illustrates an example utilizing the TCP sequence number and TCP Send Queue length information according to exemplary embodiments. As mentioned herein, at TCP level each transferred byte of the application data byte stream is uniquely defined by its send sequence number which gets signaled from sender host client 310 to the receiver host server 320 together with the data 5 itself. The TCP 325a of the host server (peer) 320 acknowledges consecutively received bytes by an acknowledgement number which is signaled back to the TCP 325 sender, and the TCP 325 updates the Unacknowledged Sequence Number (USN) local state variable of the TCP 325. By the iWARP 315 knowing (reading and storing in memory 312) the highest TCP sequence number (HSN) consumed by an iWARP packet used to transfer the application data (e.g., data 5) of a Send Queue Element to the host server 320, the iWARP 315 can compare the HSN to the TCP send state updated by host (peer) server 320 acknowledgement: If the USN is higher than the highest sequence number (HSN) used to transfer the current Work Queue Element (WQE), then the iWARP 325 determines that all application data 5 referenced by the current Send Queue Element are successfully received by the host server (peer) 320 and a Work Completion can be signaled to the application 305.

In FIG. 9, after handing over the last iWARP packet of a Send Queue Element (SQE) to TCP 325, the highest TCP send sequence number can be computed as the sum of the current Unacknowledged Sequence Number of TCP (USN) and the eventual length of the TCP send queue (QLen) (the eventual length includes the data 5). This information is stored along with the processed, but not completed Send Queue Element as the Highest Sequence Number (HSN) of that current SQE by the iWARP 315 in the memory 312.

At an appropriate point in time, the TCP's Unacknowledged Sequence Number gets retrieved again from the local TCP send state by the iWARP 315. The sender host client 310 now compares this TCP's Unacknowledged Sequence number to the HSN of processed but not yet completed Work Queue Elements and the iWARP 315 completes all of those Work Queue Elements (WQE) which have a logically lower HSN than the current USN of TCP 325. As long as not all SQE's processed but pending for Completion can be completed, this process (discussed as operation 2.1 below) must be repeated.

Now referencing a time sequence diagram 900 of FIG. 9, the time sequence diagram 900 is an example to describe utilizing the TCP sequence number and TCP Send Queue length information discussed above according to exemplary embodiments.

At operation 1.1, the application 305 posts a Work Request (WR) with ID=1 referencing application data 5 of length 2800 bytes (in the application (buffer) memory 15) to be transmitted to the host sever 320. The iWARP stack 315 creates a Send Queue Element (SQE) with the same ID=1 and inserts the SQE into the iWARP Send Queue (Send Queue shown in FIG. 3).

At operation 1.2, the iWARP stack 315 processes the SQE and constructs two iWARP packets each referencing 1400 bytes of the data 5 in the application (buffer) memory 15.

With the added iWARP header and trailer information, the iWARP packets with a cumulative size of 2840 bytes are handed over to TCP 325 by the iWARP 315 at operation 1.3.

At operation 1.4, the iWARP stack 315 reads the current TCP QLen and USN to compute the Highest Sequence Number (HSN) related to the current SQE (with ID=1). In the example, with USN 10000 and QLen 3840 bytes, the HSN is 13840. Here, QLen results from the byte length of the current packet handover (2840 bytes) to TCP and additional 1000 bytes which were already stored in the TCP send queue from an earlier data handover to TCP (not shown in FIG. 9). The QLen larger than zero indicates (to the iWARP 315) that not all data belonging to the current Work Request are yet successfully transmitted to the host server 320 (peer entity). With that, HSN is stored along with the current SQE in the memory 312 by the iWARP 315.

At operation 2.1, the iWARP stack 315 reads unacknowledged sequence number (USN) of the TCP 325 again (a later point in time). The iWARP 315 compares this USN to the HSN (previously stored in memory 312). Since all transmitted data 5 are acknowledged by the host sever 320 (peer entity), the USN is now 13841. The USN 13841 is the next available (unacknowledged) sequence number in the TCP send queue. From the comparison by the iWARP 315, the HSN is now smaller than TCP's current USN, and the SQE can be completed by the iWARP 315.

At operation 2.2, a Completion Queue Element (CQE) with ID=1 gets created and appended to the Completion Queue (Completion Queue shown in FIG. 3) by the iWARP 315. At operation 2.2, the application 305 may get informed of the availability of a CQE. At operation 2.3, the application 305 reaps a Work Completion with an ID=1, which corresponds to the initially posted Work Request with ID=1.

As mentioned above, executing the operation 1.4 may indicate that all data packets belonging to the current Work Queue Element are already received by the TCP 325*a* of the host server 320. If the TCP send queue is empty (zero), the Work Completion Element can be immediately created, and if no more processed SQE's are pending for completion operations after operation 1.4 may be omitted (i.e., not needed).

For the iWARP 315 to generate (RDMA) work completions triggered by interpreting TCP's send queue length and the TCP's send sequence numbers requires interaction between TCP 325 as a data transport and the software iWARP transport 315 as the TCP's consumer which goes beyond a normal TCP's socket's data send/receive model. Dependent on the method (first and/or second) used above, the disclosure defines the following additional functionalities of a zero-copy enabled TCP interface: The iWARP 315 is configured to obtain (retrieve and read) current TCP send queue length from the TCP 325, and the iWARP 315 is configured to retrieve the current TCP Unacknowledged Sequence Number from the TCP 325. Also, the TCP 325 may be configured to provide (push) to the iWARP 315 current TCP send queue length and/or current TCP Unacknowledged Sequence Number to the iWARP 315.

The first method which retrieves TCP send space information utilizes as input only additional interface functionality of the current TCP send queue length described. With that, the first method is less intrusive regarding changing the TCP application interface than the second method. However, a feature of the second method is that any iWARP (intervening) packet handed over to TCP 325 after finishing handover of all iWARP packets belonging to the current Work Queue Element should not be considered for determining when to complete the current Work Queue Element. In other words, the HSN does not have to be updated (incremented) to account for intervening data handed over to the TCP 325 before a previous work request is completed in the second method.

Further regarding the TCP Send Queue length (QLen), the data are handed over to TCP for transmission, and these data are added to the end of a local send queue. Dependent on TCP protocols flow and congestion control state as well as the availability of the network, TCP may immediately start data transmission or start transmission later. The length of the send queue refers to all data bytes not cumulatively acknowledged by the peer TCP entity.

Further regarding TCP Sequence numbers, TCP sequence numbers are an integral part of the TCP protocol. Sequence numbers are used to achieve the reliable transmission of user data between two TCP entities. The TCP transmits all user data as a non-interpreted continuous byte stream, and each byte of that byte stream gets assigned a consecutive sequence number. On data transmission, each TCP packet carries the sequence number of the first byte of user data and the data length within that packet. The receiving peer TCP entity acknowledges the reception of the user data by sending back a TCP packet which contains the acknowledgement number. The acknowledgement number refers to the highest consecutively received data byte. Upon reception of the acknowledgement number, the originally sending TCP entity can free all data from the TCP send queue with lower and/or equal sequence numbers than the acknowledgement number. The TCP sender now advances its local Sent Unacknowledged Sequence Number to point to the first byte of its send queue, or if the send queue was completely drained by the acknowledgement, it represents the sequence number referencing the first byte of any new data to be eventually sent later.

Further regarding the iWARP module 315, exemplary embodiments provide various implementations utilizing iWARP protocols (also referred to as an iWARP stack as understood by one skilled in the art) of the iWARP module 315. Exemplary embodiments modify iWARP protocols (also called iWARP) to include exemplary features as discussed herein that provide remote direct memory access without the additional hardware RNIC 40 shown in FIG. 2. One skilled in the art understands the functions of the RNIC 40. For illustration purposes, exemplary embodiments utilize modified iWARP to enable RDMA over Ethernet NICs. The industry has developed different network protocol stacks to implement end-to-end RDMA operations. The most widely used ones are InfiniBand™ and the recently introduced iWARP stack. While InfiniBand® requires specific interconnect hardware, iWARP adds protocols to the ubiquitous TCP/IP stack for signaling RDMA semantics [RDMAP], direct data placement [DDP] and for packet alignment and extended data integrity [MPA]. Exemplary embodiments provide features to iWARP (but are not limited to iWARP) to enable RDMA-style communication over legacy Ethernet/TCP/IP networks.

Additionally regarding asynchronous RDMA application programming interfaces, application programming interface specifications for RDMA include the RDMA verbs [RDMAV], IT-API [IT-API], DAPL [DAPL] and the Linux implementation provided by OpenFabrics [OFA]. All of them reflect the asynchronous nature of direct memory access (DMA) operations which (compared to a synchronous design) have the benefit of allowing overlapping communication and computation. This allows a network device to serve multiple users (applications) and handle many connections concurrently in a fair and non-blocking fashion.

Figure 10:
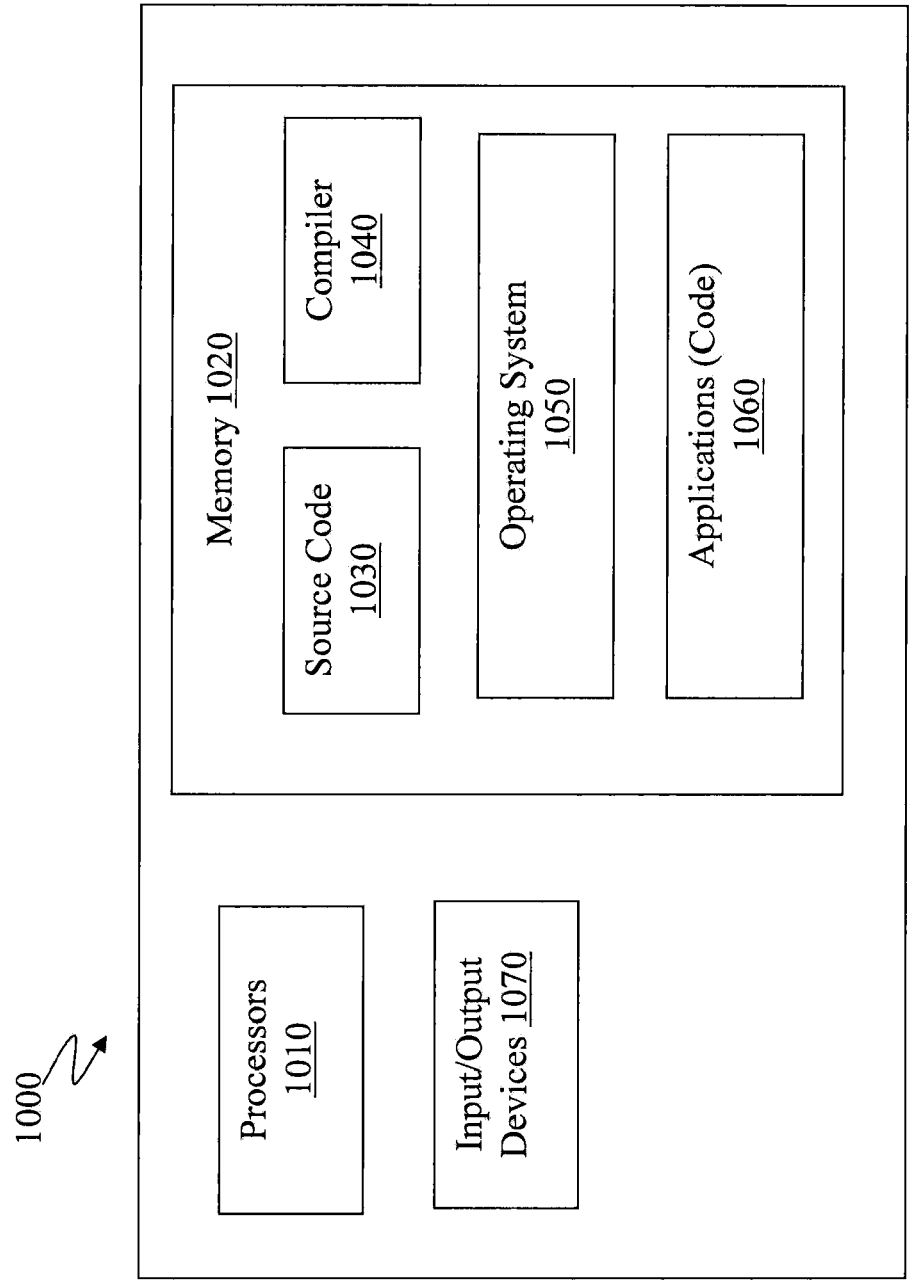
FIG. 10 illustrates an example of a computer having capabilities included in exemplary embodiments

FIG. 10 illustrates an example of a computer 1000 having capabilities, which may be included in exemplary embodiments. Various methods, procedures, modules, flow diagrams, tables, and techniques discussed herein may also incorporate and/or utilize the capabilities of the computer 1000. Moreover, capabilities of the computer 1000 may be utilized to implement features exemplary embodiments discussed herein. One or more of the capabilities of the computer 1000 may implement and/or complement any element discussed herein, such as the hosts 310 and 320.

Generally, in terms of hardware architecture, the computer 1000 may include one or more processors 1010, computer readable storage memory 1020, and one or more input and/or output (I/O) devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a data signal processor (DSP), or an auxiliary processor among several processors associated with the computer 1000, and the processor 1010 may be a semiconductor based microprocessor (in the form of a microchip) or a macroprocessor.

The computer readable memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the computer readable memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 1060 of the exemplary embodiments. As illustrated, the application 1060 comprises numerous functional components for implementing the features, processes, methods, functions, and operations of the exemplary embodiments. The application 1060 of the computer 1000 may represent numerous applications, agents, software components, modules, interfaces, controllers, etc., as discussed herein but the application 1060 is not meant to be a limitation. The operating system 1050 may control the execution of other computer programs, and provides scheduling, input-output control, file and data management, memory management, and communication control and related services.

The application(s) 1060 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction. Further, the application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as (a) an object oriented programming language, which has classes of data and methods, or (b) a procedure programming language, which has routines, subroutines, and/or functions.

The I/O devices 1070 may include input devices (or peripherals) such as, for example but not limited to, a mouse, keyboard, scanner, microphone, camera, etc. Furthermore, the I/O devices 1070 may also include output devices (or peripherals), for example but not limited to, a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 1010 utilizing Bluetooth connections and cables (via, e.g., Universal Serial Bus (USB) ports, serial ports, parallel ports, FireWire, HDMI (High-Definition Multimedia Interface), etc.).

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1060 can be embodied in any computer-readable medium 1020 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

In exemplary embodiments, where the application 1060 is implemented in hardware, the application 1060 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Further, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for data transmission executed on a sending device without intermediate buffering on the sending device while in the process of data transmission, comprising:
   receiving a request to transmit data from the sending device to a receiving device over a network, wherein the receiving device is to receive the data as incoming data;
   formatting the data from application memory on the sending device for transmitting to the receiving device;
   retrieving a length of a send queue on the sending device to later determine when a completion element should be generated on the sending device;
   transmitting the data from the sending device to the receiving device without intermediate buffering in the sending device;
   comparing the length of send queue to an expected send queue length on the sending device; and
   if the length of the send queue is at least one of equal to or less than the expected send queue length, generating the completion element on the sending device.

2. The method of claim 1, further comprising if the length of the send queue is greater than the expected send queue length, comparing the length of the send queue to the expected send queue length at a later point in time; and
   if the length of the send queue is at least one of equal to or less than the expected send queue length, generating the completion element.

3. The method of claim 1, wherein receiving the request to transmit data from the device to the receiving device over the network comprises: receiving a work request that transfers permission for application memory from an application to a software stack; and retrieving by the software stack the data directly from the application memory without copying the data in memory of the device; and
   further comprising: in response to generating the completion element, transferring the permission for the application memory from the software stack back to the application.

4. The method of claim 1, wherein formatting the data from application memory for transmitting to the receiving device comprises formatting the data according to Internet wide area remote direct memory access (iWARP) protocols.

5. The method of claim 1, wherein retrieving the length of send queue comprises reading a current length of the send queue after the data to be transmitted is added to the send queue.

6. The method of claim 1, further comprising creating the expected send queue length with a value of zero.

7. The method of claim 1, further comprising if different data are added to the send queue before generating the completion element for the data, incrementing the expected send queue length by a length of the different data added to the send queue.

8. A method for data transmission executed on a sending device without intermediate buffering on the sending device while in the process of data transmission, comprising:
   receiving a request to transmit data from the sending device to a receiving device over a network, wherein the receiving device is to receive the data as incoming data;
   formatting the data from application memory on the sending device for transmitting to the receiving device;
   computing a highest sequence number at a point in time on the sending device to later determine that a completion element should be generated on the sending device, the highest sequence number being the summation of a length of send queue and an unacknowledged sequence number on the sending device;
   transmitting the data from the sending device to the receiving device without intermediate buffering in the sending device;
   comparing the highest sequence number to the unacknowledged sequence number at a different point in time on the sending device; and
   if the highest sequence number is less than the unacknowledged sequence number at the different point in time, generating the completion element on the sending device.

9. The method of claim 8, further comprising if the highest sequence number is not less than the unacknowledged sequence number at the different point in time, comparing the highest sequence number to the unacknowledged sequence number at a later point in time; and
   if the highest sequence number is less than the unacknowledged sequence number at the later point in time, generating a completion element.

10. The method of claim 8, wherein receiving the request to transmit data from the device to the receiving device over the network comprises: receiving a work request that transfers permission for application memory from an application to a software stack; and retrieving by the software stack the data directly from the application memory without copying the data in memory of the device; and
    further comprising: in response to generating the completion element, transferring the permission for the application memory from the software stack back to the application.

11. The method of claim 8, wherein formatting the data from application memory for transmitting to the receiving device comprises formatting the data according to Internet wide area remote direct memory access (iWARP) protocols.

12. A computer program product, tangibly embodied on a non-transitory computer readable medium, the computer program product including instructions for causing a computer to execute a method for data transmission on a sending device without intermediate buffering on the sending device while in the process of data transmission, comprising:
    receiving a request to transmit data from the sending device to a receiving device over a network, wherein the receiving device is to receive the data as incoming data;
    formatting the data from application memory on the sending device for transmitting to the receiving device;
    retrieving a length of a send queue on the sending device to later determine that a completion element should be generated on the sending device;
    transmitting the data from the sending device to the receiving device without intermediate buffering in the sending device;
    comparing the length of send queue to an expected send queue length on the sending device; and
    if the length of the send queue is at least one of equal to or less than the expected send queue length, generating the completion element on the sending device.

13. The computer program product of claim 12, further comprising if the length of the send queue is greater than the expected send queue length, comparing the length of the send queue to the expected send queue length at a later point in time; and
    if the length of the send queue is at least one of equal to or less than the expected send queue length, generating the completion element.

14. The computer program product of claim 12, wherein receiving the request to transmit data from the device to the receiving device over the network comprises: receiving a work request that transfers permission for application memory from an application to a software stack; and retrieving by the software stack the data directly from the application memory without copying the data in memory of the device; and
    further comprising: in response to generating the completion element, transferring the permission for the application memory from the software stack back to the application.

15. The computer program product of claim 12, wherein formatting the data from application memory for transmitting to the receiving device comprises formatting the data according to Internet wide area remote direct memory access (iWARP) protocols.

16. The computer program product of claim 12, wherein retrieving the length of send queue comprises reading a current length of the send queue after the data to be transmitted is added to the send queue.

17. The computer program product of claim 12, further comprising creating the expected send queue length with a value of zero.

18. The computer program product of claim 12, further comprising if different data are added to the send queue before generating the completion element for the data, incrementing the expected send queue length by a length of the different data added to the send queue.

19. A method for data transmission executed on a device without intermediate buffering on the sending device while in the process of data transmission, comprising:
    receiving a request to transmit data from the sending device to a receiving device over a network, wherein the receiving device is to receive the data as incoming data;
    formatting the data from application memory on the sending device for transmitting to the receiving device;
    retrieving a send state on the sending device to later determine when a completion element should be generated on the sending device;
    transmitting the data from the sending device to the receiving device without intermediate buffering in the sending device;
    comparing the send state to an expected send state to determine if the send state meets the expected send state on the sending device; and
    if the send state meets the expected send state, generating the completion element on the sending device.

20. The method of claim 19, wherein the send state is a Transmission Control Protocol (TCP) send state; and
    wherein the expected send state is an expected TCP send state.

21. The method of claim 19, wherein the expected send state is calculated by a software stack using a local TCP stack for data transmission.

22. The method of claim 19, wherein comparing the send state to the expected send state is based on parameters of the send state relative to parameters of the expected send state.

* * * * *